United States Patent
Lee et al.

(10) Patent No.: US 12,375,307 B2
(45) Date of Patent: Jul. 29, 2025

(54) OPERATING METHOD OF PHYSICALLY UNCLONABLE FUNCTION MAGNETIC MEMORY DEVICE

(71) Applicant: KOREA UNIVERSITY RESEARCH AND BUSINESS FOUNDATION(, Seoul (KR)

(72) Inventors: Kyung Jin Lee, Seoul (KR); Jongsun Park, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 883 days.

(21) Appl. No.: 17/566,004

(22) Filed: Dec. 30, 2021

(65) Prior Publication Data

US 2022/0231867 A1 Jul. 21, 2022

(30) Foreign Application Priority Data

Jan. 20, 2021 (KR) .................. 10-2021-0007764

(51) Int. Cl.
*G11C 11/155* (2006.01)
*G11C 11/16* (2006.01)
*G11C 17/02* (2006.01)
*H04L 9/32* (2006.01)

(52) U.S. Cl.
CPC .......... *H04L 9/3278* (2013.01); *G11C 11/155* (2013.01); *G11C 11/161* (2013.01); *G11C 17/02* (2013.01)

(58) Field of Classification Search
CPC ..... G11C 11/155; G11C 11/161; G11C 17/02; H04L 9/3278

USPC ......................................................... 365/158
See application file for complete search history.

(56) References Cited

U.S. PATENT DOCUMENTS

| | | | |
|---|---|---|---|
| 10,608,169 B2 * | 3/2020 | Kim .................. | H10N 52/101 |
| 2012/0300539 A1 * | 11/2012 | Lombard ............ | G11C 11/5607 365/158 |
| 2013/0289383 A1 * | 10/2013 | Flynn .................. | A61B 5/05 600/409 |
| 2015/0071431 A1 | 3/2015 | Zhu et al. | |
| 2017/0236570 A1 * | 8/2017 | Kent .................. | G11C 11/1675 365/158 |

(Continued)

FOREIGN PATENT DOCUMENTS

| KR | 10-1373576 B1 | 3/2014 |
|---|---|---|
| KR | 10-2017-0095163 A | 8/2017 |

OTHER PUBLICATIONS

Korean Office Action issued on Feb. 22, 2022 in corresponding Korean Patent Application No. 10-2021-0007764 (3 pages in Korean).

*Primary Examiner* — Ly D Pham
(74) *Attorney, Agent, or Firm* — NSIP Law (57) ABSTRACT

A physically unclonable function magnetic memory device includes a plurality of magnetic resistance cells disposed on a substrate and each including a pinned magnetic layer, a free magnetic layer, and a tunnel insulating layer or a non-magnetic conductive layer interposed between the pinned magnetic layer and the free magnetic layer. In an operating method of the physically unclonable magnetic memory device, an external magnetic field, decaying with time, is applied to the plurality of magnetic resistance cells to randomize a magnetization direction of the free magnetic layer of each of the plurality of magnetic resistance cells.

11 Claims, 9 Drawing Sheets

(56) References Cited

U.S. PATENT DOCUMENTS

2017/0316813 A1* 11/2017 Lee ........................ H10N 50/85
2018/0356474 A1* 12/2018 Hammerschmidt ........................
  H01F 10/3254
2020/0259075 A1* 8/2020 Lee ........................ H10N 50/85

* cited by examiner

OPERATING METHOD OF PHYSICALLY UNCLONABLE FUNCTION MAGNETIC MEMORY DEVICE

CROSS-REFERENCE TO RELATED APPLICATIONS

This U.S. non-provisional patent application claims priority under 35 U.S.C. § 119 to Korean Patent Application No. 10-2021-0007764, filed on Jan. 20, 2021, in the Korean Intellectual Property Office, the entire contents of which are hereby incorporated by reference.

TECHNICAL FIELD

The present disclosure relates to an operating method of a magnetic memory device and, more particularly, to an operating method of implementing a physically unclonable function using a magnetic memory device and a device therefor.

BACKGROUND

Recently, data transmission has been frequently performed in various Internet of Things (IoT) environments, such as use of smart devices in the fields of financial transactions and unmanned automobiles. Accordingly, there is increasing demand for hardware-based encryption technology suitable for IoT devices, rather than security technology which is secure from hacking, in particular, software-based encryption technology suffering from a high risk of data leakage.

A physically unclonable function (PUF) technology, called a unique hardware fingerprint, means that digital values are generated in an unpredictable and random manner without externally inputting security data such as a unique ID or a security key of a chip. Due to random characteristics of the PUF technology, security data generated by a PUF cannot be hacked or reproduced. Therefore, the PUF technology is appropriate to a hardware-based cryptographic technology for IoT devices.

To obtain PUFs, a device should satisfy the following three conditions.

(i) randomness: a data pattern written in a device should be random on an externally unpredictable level.

(ii) irrelevancy: when random data patterns are written in different devices in the same manner, data patterns of the respective devices should be different and irrelevant.

(iii) reliability: data stored in a device should be retained for a long period of time and should always output the same value.

Existing researched PUFs may be classified into a physical characteristic-based PUF, a delay-based PUF, and a memory-based PUF, depending on implementation methods. The physical characteristic-based PUF refers to a PUF of which response is determined by a physical state of a conductive layer. A typical example of the physical characteristic-based PUF is a VIA-PUF [Kim Dong Kyue and Kim Ji-Hoon, "HARDWARE DEVICE AND AUTHORIZATION METHOD THEREFOR", Korean Patent Publication No. 10-2017-0095163, published on Aug. 22, 2017]. A VIA serves to vertically connect two metal layers, and a state of connection between the metal layers may change into an open state or a short state, depending on a VIA hole size. To implement a PUF in such a manner, an open/short probability should be 50%. However, it may be difficult to adjust a VIA hole size such that an open/short probability should be 50% in an actual process.

An existing delay-based PUF is based on a characteristic in which a delay speed of an input signal varies depending on a process deviation. A typical example of delay-based PUF is an Arbiter PUF [HONG, Seok-Hie and Kim Hyun MM, "DES Encryption System", filed on Dec. 26, 2012, Korean Patent Application No. 10-2012-0153387, registered on Mar. 12, 2014, Korean Patent Registration No. 10-137356].

The arbiter PUF has a structure having two different paths implemented by a plurality of multiplexers (MUX) and using a difference in delay speeds between the two paths. Such a structure may be advantageous in having many challenge-response pairs, but may be disadvantageous in that reliability is deteriorated because an output value varies depending on environmental factors such as a temperature change, a deviation of a supply voltage, aging, external noise, and the like.

An existing memory-based PUF uses two cross-coupled inverter structures. A typical example of a memory-based PUF is an SRAM-based PUF, but a general 6T SRAM suffers from an issue such as bit flipping caused by a changes in external environment.

An initial value of an SRAM cell may be affected by a temperature change, a variation of a supply voltage, external noise, and the like, which causes reliability of the PUF to be deteriorated.

Therefore, even when an existing implementation method is used, it may be difficult for a device to satisfy (i) randomness, (ii) irrelevancy, and (iii) reliability so as to have PUF functions.

The present disclosure provides a PUF implementation method, satisfying all conditions of (i) randomness, (ii) irrelevancy, and (iii) reliability using a magnetic memory device, and an apparatus therefor.

SUMMARY

An aspect of the present disclosure is to provide a magnetic memory-based PUF implementation method, satisfying three conditions ((i) randomness, (ii) irrelevancy, and (iii) reliability) for implementing PUFs using a magnetic memory device.

Another aspect of the present disclosure is to provide an apparatus for embodying a magnetic memory-based PUF implementation method.

A physically unclonable function magnetic memory device according to an example embodiment includes a plurality of magnetic resistance cells disposed on a substrate and each including a pinned magnetic layer, a free magnetic layer, and a tunnel insulating layer or a non-magnetic conductive layer interposed between the pinned magnetic layer and the free magnetic layer. In an operating method of the physically unclonable magnetic memory device, an external magnetic field, decaying with time, is applied to the plurality of magnetic resistance cells to randomize a magnetization direction of the free magnetic layer of each of the plurality of magnetic resistance cells.

In an example embodiment, the external magnetic field may rotate at a rotation frequency f with time in a plane including a magnetic easy axis of the free magnetic layer. Strength of the external magnetic field may have a decay constant and is exponentially decreased with time.

In an example embodiment, the rotation frequency f may be tens of hertz (Hz) to hundreds of Hz, and the decay constant may be greater than a reciprocal of the rotation frequency (1/f).

In an example embodiment, the rotation frequency f may be 120 Hz, and the decay constant may be 1 second (sec).

In an example embodiment, strength of the external magnetic field may have a decay constant and may be exponentially decreased with time, and the substrate may rotate at a constant frequency with respect to a rotation axis, perpendicular to a plane defined by a magnetic easy axis direction of the free magnetic layer and the external magnetic field.

In an example embodiment, the pinned magnetic layer and the free magnetic layer may be magnetized in a direction, perpendicular to a film surface.

In an example embodiment, the pinned magnetic layer and the free magnetic layer may be magnetized in a direction, horizontal to a film surface.

In an example embodiment, a magnetic field application unit, configured to apply the external magnetic field, may include: an electromagnet configured to reduce strength of an external magnetic field in a predetermined direction with time; a motor configured to support the substrate and to rotate the substrate; a controller configured to control current flowing through the electromagnet and to control the motor; and a substrate rotation unit configured to connect the substrate and a rotation axis of the motor to each other and to support the substrate.

In an example embodiment, a magnetic field application unit, configured to apply the external magnetic field, may include: a first electromagnet configured to apply the external magnetic field; a second electromagnet configured to generate a second magnetic field in a second direction, perpendicular to the first direction; and a controller configured to control currents flowing through the first electromagnet and the second electromagnet such that an external magnetic field, which is a vector sum of the first magnetic field and the second magnetic field, rotates while decreasing with time in a plane defined by the first direction and the second direction. The plane, defined by the first direction and the second direction, may include a magnetic easy axis of the free magnetic layer.

An apparatus for writing data in a physically unclonable magnetic memory device according to an example embodiment includes: a first electromagnet configured to apply the external magnetic field; a second electromagnet configured to generate a second magnetic field in a second direction, perpendicular to the first direction; and a controller configured to control currents flowing through the first electromagnet and the second electromagnet such that an external magnetic field, which is a sum of the first magnetic field and the second magnetic field, rotates while decreasing with time in a plane defined by the first direction and the second direction. A physically unclonable magnetic device includes a plurality of tunnel junction cells, the external magnetic field randomizes a magnetization direction of a free layer of each of a plurality of tunnel junction unit cells, and the plane, defined by the first direction and the second direction, includes a magnetic easy axis of the free magnetic layer.

An apparatus for writing data in a physically unclonable magnetic memory device according to an example embodiment includes: an electromagnet configured to reduce strength of an external magnetic field in a predetermined direction with time; a motor configured to support a substrate and to rotate the substrate; a controller configured to control current flowing through the electromagnet and to control the motor; and a substrate rotation unit configured to mount the substrate thereon and to connect a rotation axis of the motor. A physically unclonable magnetic memory device includes a plurality of tunnel junction cells disposed on the substrate, the external magnetic field randomizes a magnetization direction of a free magnetic layer of each of a plurality of tunnel junction unit cell, and the substrate rotates at a constant frequency f with respect to a rotation axis, perpendicular to a plane defined by a magnetic easy axis of the free magnetic layer and the external magnetic field.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Various example embodiments will be described more fully hereinafter with reference to the accompanying drawings, in which some example embodiments are shown. The present disclosure may, however, be embodied in many different forms and should not be construed as limited to the example embodiments set forth herein. Rather, these example embodiments are provided so that this disclosure will be thorough and complete, and will fully convey the scope of the present disclosure to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A magnetic memory device according to an example embodiment may be packaged as separate chips, or may be directly integrated with a memory device, a logic device, or a communications device.

A magnetic memory device according to an example embodiment may have a magnetic tunnel junction structure or a giant magnetoresistance structure.

A magnetic tunnel junction magnetic memory device may have a magnetic tunnel junction structure including a tunnel insulating layer interposed between two magnetic layers having magnetic properties. Magnetic tunnel junction structures may be arranged in a matrix. Each of the magnetic tunnel junction structures may operate as a unit cell storing data therein.

A magnetic tunnel junction structure, having a free magnetic layer/a tunnel insulating layer/a pinned magnetic layer, may provide a unit cell. A magnetization direction of the free magnetic layer may be changed by an external stimulus (current or an external magnetic field). The pinned magnetic layer may be a pinned magnetic layer having a fixed magnetization direction.

The magnetic tunnel junction structure may cause a tunnel magnetoresistance effect in which electrical resistance varies depending on a relative magnetization direction between the free magnetic layer and the pinned magnetic layer. The tunnel magnetoresistance effect may occur because up-spin and down-spin electrons flow at different degrees in the magnetic tunnel junction structure while tunneling a tunnel insulating layer. Due to the tunneling magnetoresistance effect, the relative magnetization direction between the free magnetic layer and the pinned magnetic layer may be used to control current flowing through a tunnel junction unit cell.

A magnetic memory device may determine a magnetization direction of the free magnetic layer by switching the magnetization direction of the free magnetic layer using an external magnetic field or current. A difference in resistance depending on the relative magnetization direction between the free magnetic layer and the pinned magnetic layer may be used as data. For example, a state in which the relative magnetization directions between the free magnetic layer and the pinned magnetic layer is parallel is used as data "0," and a state in which the relative magnetization direction is anti-parallel is used as data "1." Written magnetic data may exhibit nonvolatility, and thus, may be retained for a large amount of time by magnetic anisotropy of the free magnetic layer and the pinned magnetic layer.

Data storage time ti of a magnetic memory device may be given as time during which a magnetization direction is averagely maintained against thermal energy, and may be represented as follows:

$$\tau = \tau_0 \exp\left(\frac{K_{eff} V}{k_B T}\right) = \tau_0 \exp\left(\frac{H_{K,eff} M_S V}{2 k_B T}\right) \quad \text{[Equation 1]}$$

In Equation 1, $\tau_0$ is a reciprocal of an attempt frequency and about 1 ns, $K_{eff}$ is effective magnetic anisotropy energy density of a free magnetic layer, V is a volume of the free magnetic layer, $k_B$ is a Boltzmann constant ($=1.381\times10^{-16}$ erg/K), and T is a Kelvin temperature. $K_{eff}$ is represented as a product of saturated magnetization (MS) of the free magnetic layer and an effective magnetic anisotropy magnetic field $H_{K,eff}$.

In addition, $K_{eff} V / k_B T$ may be defined as thermal stability $\Delta$ of the magnetic memory device. For example, when satisfying a condition of $\Delta=40$ at room temperature, written data may be averagely maintained for about 7.5 years, so that the magnetic memory device may be applied as a nonvolatile memory. Accordingly, the magnetic memory device satisfying a condition of $\Delta>40$ may satisfy (iii) reliability condition, among the three requirements for implementing the PUF.

To implement PUFs using a magnetic memory, (iii) reliability, (i) randomness, and (ii) irrelevancy conditions should be satisfied at the same time. However, since magnetic memory development has been focused on a method of efficiently writing predetermined data having regularity, there is no implementation method of writing data having randomness and irrelevancy.

Figure 1:
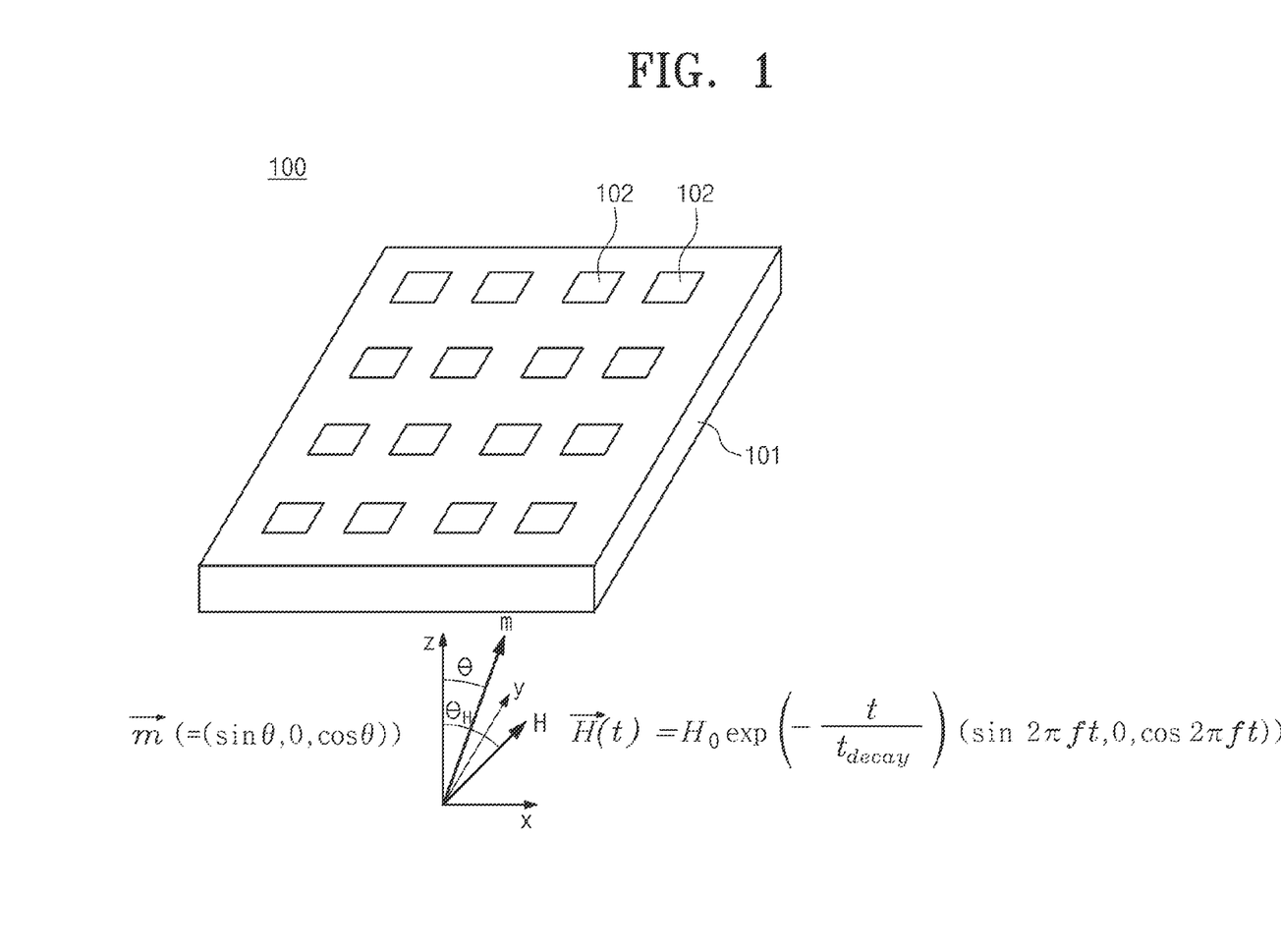
FIG. 1 is a conceptual diagram illustrating a PUF magnetic memory device according to example embodiment of the present disclosure.

FIG. 1 is a conceptual diagram illustrating a PUF magnetic memory device according to example embodiment.

Referring to FIG. 1, a PUF magnetic memory device 100 according to embodiments may include a plurality of magnetic resistance cells 102 disposed on a substrate 101 and each including a pinned magnetic layer 116, a free magnetic layer 116, and a tunnel insulating layer 114 or a non-magnetic conductive layer interposed between the pinned magnetic layer 116 and the free magnetic layer 112. An external magnetic field H, decaying with time, may be applied to the plurality of magnetic resistance cells 102 to randomize a magnetization direction of the free magnetic layer 112 of the plurality of magnetic resistance cells 102.

The substrate 101 may be a semiconductor substrate. For example, the substrate may be a silicon substrate, and may further include a logic circuit region and a communication circuit region.

A description will be provided under the assumption that the magnetoresistive cell is a magnetic tunnel junction cell. The PUF magnetic memory device 100 may include N magnetic tunnel junction cells 102. An electromagnet may apply an external magnetic field H, decaying with time, to the magnetic tunnel junction cells 102. The external magnetic field H may rotate at a rotation frequency f with time in a plane including a magnetic easy axis of the free magnetic layer, and a strength of the external magnetic field may have a decay constant and may be exponentially decreased with time.

When the external magnetic field H is applied to the free magnetic layer in which magnetic data is written, magnetic energy may vary depending on strength and a direction of magnetization and strength and a direction of the magnetic field.

Figure 2:
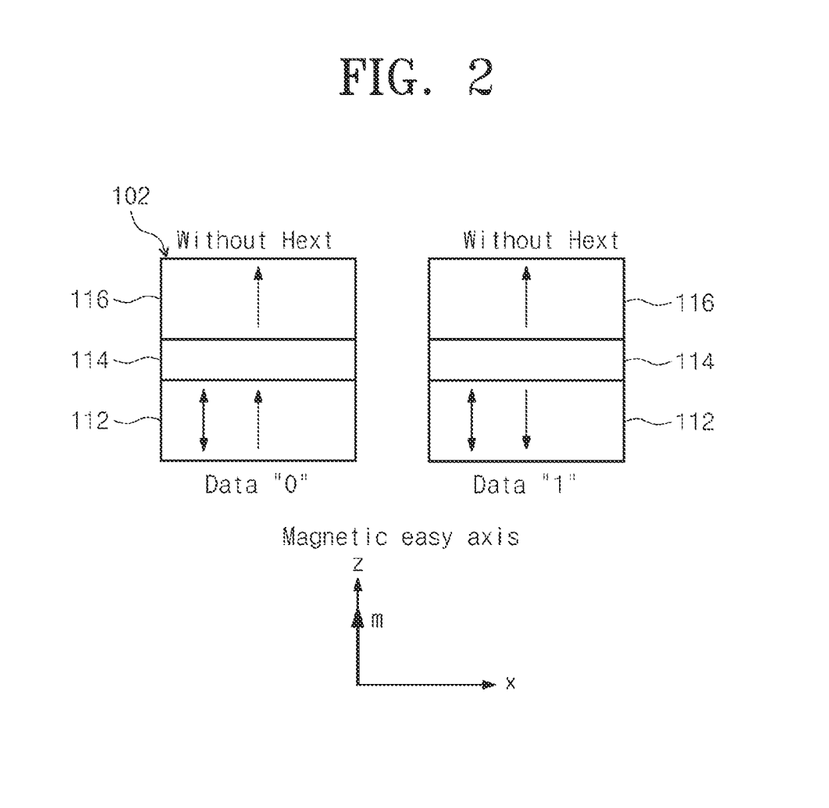
FIG. 2 is a diagram illustrating a magnetization direction of a free magnetic layer of a magnetic tunnel junction cell in the absence of an external magnetic field.

FIG. 2 is a diagram illustrating a magnetization direction of a free magnetic layer of a magnetic tunnel junction cell in the absence of an external magnetic field.

Referring to FIG. 2, the pinned magnetic layer 116 and the free magnetic layer 112 may have perpendicular magnetic anisotropy. Data may be stored depending on whether a magnetization direction of the free magnetic layer 112 is parallel or anti-parallel to a magnetic easy axis. In the case in which the free magnetic layer 112 and the pinned magnetic layer 116 are parallel, the case may indicate data "0," and in the case in which the free magnetic layer 112 and the pinned magnetic layer 116 are anti-parallel, the case may indicate data "1."

Figure 3:
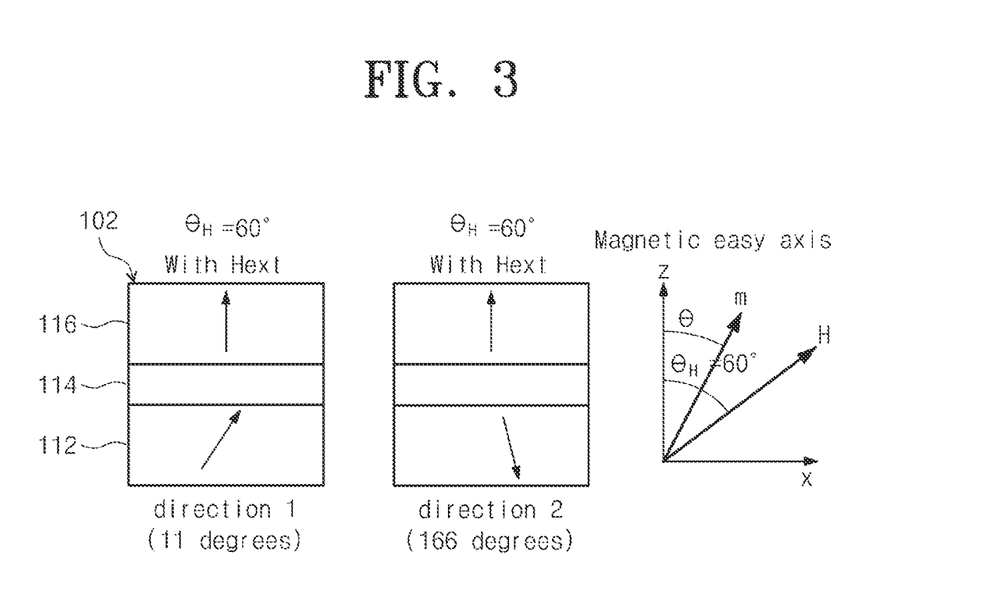
FIG. 3 is a diagram illustrating a magnetization direction of a free magnetic layer of a magnetic tunnel junction cell in the presence of an external magnetic field ($\theta_H$=60 degrees).

FIG. 3 is a diagram illustrating a magnetization direction of a free magnetic layer of a magnetic tunnel junction cell in the presence of an external magnetic field ($\theta_H$=60 degrees).

Figure 4:
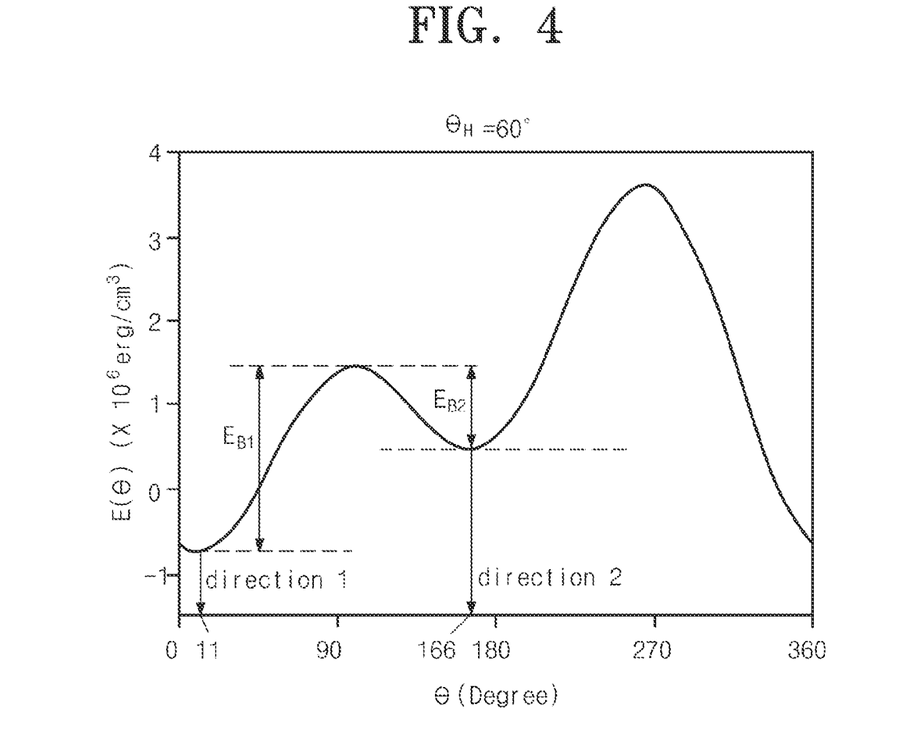
FIG. 4 is a graph illustrating a simulation result representing $\theta$-dependent magnetic energy density E($\theta$) in the presence of an external magnetic field ($\theta_H$=60 degrees).

FIG. 4 is a graph illustrating a simulation result representing $\theta$-dependent magnetic energy density E($\theta$) in the presence of an external magnetic field ($\theta_H$=60 degrees).

Referring to FIGS. 3 and 4, when a magnetic easy axis of the free magnetic layer 112 is a positive Z-axis and an external magnetic field H is applied, a unit vector of magnetization of the free magnetic layer 112 is given as follows:

$$\vec{m}( = (\sin\theta, 0, \cos\theta))$$

The unit vector of magnetization of the free magnetic layer 112 may have a predetermined angle $\theta$ with respect to the magnetic easy axis (the Z-axis) of the free magnetic layer 112 in a plane (an X-Z plane) including the magnetization direction of the free magnetic layer 112. The external magnetic field H may not change the magnetization direction of the pinned magnetic layer 116. A vector of the external magnetic field may be represented as follows:

$$\vec{H}( = H_0(\sin\theta_H, 0, \cos\theta_H))$$

The vector of the external magnetic field may be represented as a predetermined angle $\theta_H$ with respect to the magnetic easy axis (the Z-axis) of the free magnetic layer 112 in the plane (the X-Z plane) including the magnetization direction of the free magnetic layer 112. The angle $\theta_H$ may be an angle between the external magnetic field and the magnetic easy axis.

When the vector of the external magnetic field is present in the X-Z plane and the magnetic easy axis is in a positive Z direction, magnetic energy density E($\theta$) depending on the magnetization direction of the free magnetic layer 112 is given as follows:

$$E(\theta) = K_{eff}\sin^2\theta - H_0 M_S \cos(\theta - \theta_H) \quad \text{[Equation 2]}$$

In the Equation 2, $H_0$ is strength of an external magnetic field, $M_S$ is saturated magnetization of the free magnetic layer 112, $K_{eff}$ is effective magnetic anisotropy energy density of the free magnetic layer 112, $\theta$ is an angle between the magnetic easy axis (the Z-axis) and the magnetization direction of the free magnetic layer 112, and $\theta_H$ is an angle between the magnetic easy axis (the Z-axis) of the free magnetic layer 112 and the external magnetic field.

Referring to FIGS. 3 and 4, $K_{eff}$=2.5×10$^6$ erg/cm$^3$, $H_0$=1250 Oe, $M_S$=1000 emu/cm$^3$, and $\theta_H$=60. In this case, angles indicated by direction 1 (11 degrees) and direction 2 (166 degrees) may be the local minimum energies, respectively. Accordingly, in the presence of an external magnetic field H ($\theta_H$=60 degrees), the magnetization direction of the free magnetic layer 112 may be oriented in one of the two directions.

In the situation in which thermal energy such as room temperature is given, both a probability $P_{1\to2}$ of switching from Direction 1 to Direction 2 for time t due to thermal perturbation and a probability $P_{2\to1}$ of switching from direction 2 to direction 1 for time t due to the thermal perturbation are non-zero.

The probability $P_{1\to2}$ of switching from Direction 1 to Direction 2 and the probability $P_{2\to1}$ of switching from Direction 2 to Direction 1 are given as follows:

$$P_{1\to2} = \frac{r_1}{r_1+r_2}(1-\exp(-(r_1+r_2)t)) \quad \text{[Equation 3]}$$

$$P_{2\to1} = \frac{r_2}{r_1+r_2}(1-\exp(-(r_1+r_2)t))$$

$$r_1 = \frac{1}{\tau_0}\exp\left(-\frac{E_{B1}}{k_B T}\right)$$

$$r_2 = \frac{1}{\tau_0}\exp\left(-\frac{E_{B2}}{k_B T}\right)$$

In Equation 3, $E_{B1}$ is a size of a first energy barrier which should be overcome to change from Direction 1 to Direction 2, $E_{B2}$ is a size of a second energy barrier which should be overcome to change from Direction 2 to Direction 1, and $\tau_0$ is a reciprocal of an attempt frequency, which is about 1 ns.

Referring to FIG. 4, since EB1>EB2, $P_{1\to2}<P_{2\to1}$. As a result, the magnetization of the free magnetic layer 112 may prefer Direction 1. In this situation, among N magnetic tunnel junction cells, the number of cells facing Direction 1 may be greater than the number of cells facing Direction 2. In this situation, when the external magnetic field H is removed, the magnetization direction may be aligned in a positive Z direction because Direction 1 is close to zero degrees, and the magnetization direction may be aligned in a negative Z direction because Direction 2 is close to 180 degrees.

Accordingly, the number of cells aligned in the positive Z direction may be greater than the number of cells aligned in the negative Z direction, in the magnetization direction of the free magnetic layer 112.

Such a situation does not satisfy the PUF condition (i) RANDOMNESS in which the magnetization direction of the free layer should be random.

Figure 5:
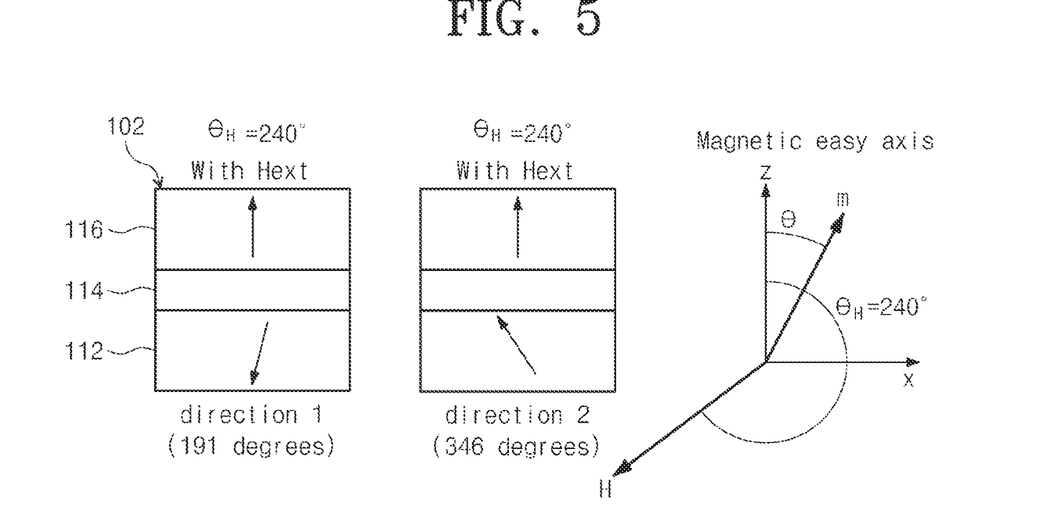
FIG. 5 is a diagram illustrating a magnetization direction of a free magnetic layer of a magnetic tunnel junction cell in the presence of an external magnetic field ($\theta_H$=240 degrees).

FIG. 5 is a diagram illustrating a magnetization direction of a free magnetic layer of a magnetic tunnel junction cell in the presence of an external magnetic field ($\theta_H$=240 degrees).

Figure 6:
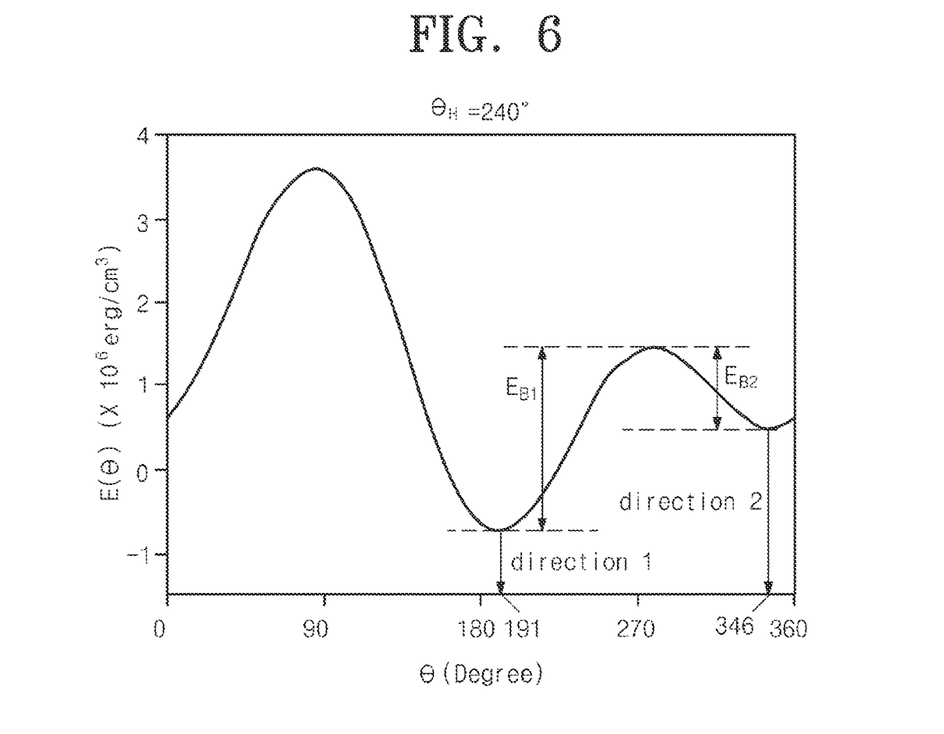
FIG. 6 is a graph illustrating a simulation result representing $\theta$-dependent magnetic energy density E($\theta$) in the presence of an external magnetic field ($\theta_H$=240 degrees).

FIG. 6 is a graph illustrating a simulation result representing $\theta$-dependent magnetic energy density E($\theta$) in the presence of an external magnetic field ($\theta_H$=240 degrees).

Referring to FIGS. 5 and 6, EB1>EB2, Direction 1 is 191 degrees, and Direction 2 is 346 degrees. Accordingly, after an external magnetic field H is removed, the number of cells aligned in a negative Z direction is greater than the number of cells aligned in a positive Z direction, in a magnetization direction of the free magnetic layer 112. That is, the case opposite to that of FIG. 4 may occur.

According to the examples described with reference to FIGS. 4 and 6, the number of cells, in which the magnetization direction of the free magnetic layer 112 is aligned with the positive Z or negative Z direction, may be adjusted depending on the direction of the external magnetic field H.

In an example embodiment, when a magnetic field H rotating with time is applied to a magnetic memory device, preferred directions 1 and 2 of the external magnetic field H may be changed every moment. As a result, $P_{1 \to 2}$ and $P_{2 \to 1}$ may also be changed every moment. For example, $P_{1 \to 2} < P_{2 \to 1}$ may be satisfied at one point in time, but $P_{1 \to 2} > P_{2 \to 1}$ may be satisfied at another point in time. Due to the randomness caused by thermal perturbation, both a process of switching from Direction 1 to Direction 2 and a process of switching from Direction 2 to Direction 1 may be performed with some degree of randomness. When the external magnetic field H rotating with time is applied to the magnetic memory device 100 for a sufficient amount of time, N magnetic tunnel junction cells 102 may store data "0" or "1" at random.

A type of time-varying external magnetic field H according to example embodiments may be in a situation in which strength of an external magnetic field is fixed and only a direction thereof varies depending on time. For example, the external magnetic field vector H(t) may be given as follows:

$$\vec{H}(t) = H_0(\sin 2\pi ft, 0, \cos 2\pi ft) \quad \text{[Equation 4]}$$

In Equation 4, $H_0$ is strength of the external magnetic field, and f is a rotation frequency at which the magnetic field rotates.

Figure 7:
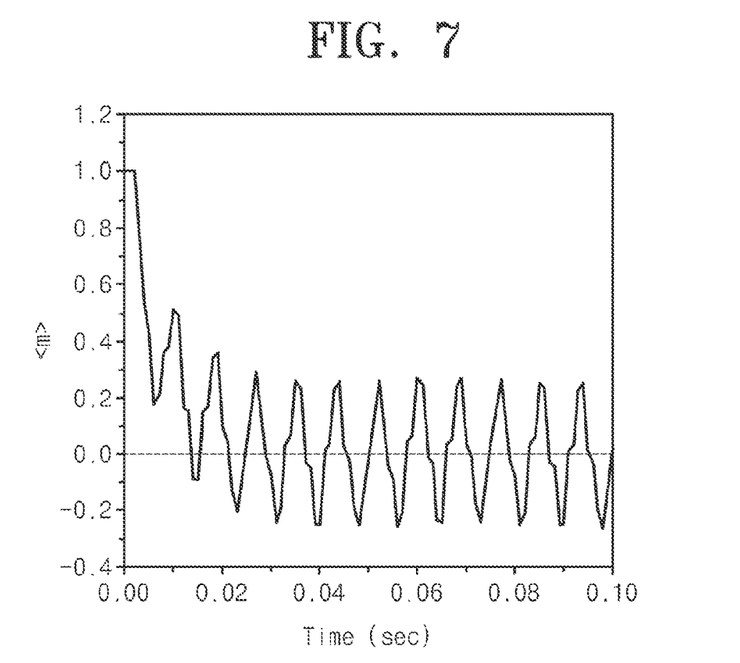
FIG. 7 is a graph illustrating a result obtained by calculating a time-dependent average magnetization direction based on a Monte-Carlo model when an external magnetic field H, rotating with time, is applied.

FIG. 7 is a graph illustrating a result obtained by calculating a time-dependent average magnetization direction based on a Monte-Carlo model when an external magnetic field H, rotating with time, is applied.

Referring to FIG. 7, when the number N of magnetic tunnel junction cells 102 is 10,000, a time-varying external magnetic field defined by Equation 4 may be applied to a magnetic memory device. A time-dependent average magnetization direction <m> is given as follows:

$$\langle m \rangle = \frac{1}{N} \sum_{i=1}^{N} m_i$$

The time-dependent average magnetization direction <m> was calculated using a Monte-Carlo model based on a Metropolitan algorithm. When a magnetization direction of magnetic tunnel junction cells 102 is close to positive Z, it may defined that $m_i$=+1. When the magnetization direction of the magnetic tunnel junction cells 102 is close to negative Z, it may be defined that $m_i$=−1.

When <m>=1, the magnetization of all magnetic tunnel junction cells may be aligned in the positive Z. When <m>=−1, the magnetization of all magnetic tunnel junction cells may be aligned in the negative Z.

When <m>=0, N/2 magnetic tunnel junction cells may be aligned in the positive Z direction. Meanwhile, the other N/2 magnetic tunnel junction cells may be aligned in the negative Z direction. Since a probability of whether a magnetization direction of a specific magnetic tunnel junction cell is the positive Z direction or the negative Z direction is 50%, randomness may be significantly increased. For example, as <m> approaches zero, the randomness may be increased.

Referring to FIG. 7, <m> is set to be 1 under the conditions that thermal stability Δ=40, $H_0$=586 Oe, rotation frequency f=120 Hz, and t=0, as initial conditions immediately before an external magnetic field is applied. In this case, <m> may be rapidly decreased in initial time immediately after the external magnetic field is applied. However, <m> may constantly oscillate according to a magnetic field rotation frequency of the external magnetic field. The magnetization direction may prefer positive Z at a point in time at which the external magnetic field faces the positive Z. Meanwhile, the magnetization direction may prefer negative Z at a point in time at which the external magnetic field faces the negative Z.

When the magnetic field is removed at any time in a situation in which a predetermined vibration appears, <m> may have one value, among values of vibration width.

Referring to FIG. 7, <m> may vibrate between +0.25 and −0.25 with time. When an external magnetic field is removed at a moment at which <m>=0.25, randomness may be reduced as compared with randomness at a moment at which <m>=0.

To address such an issue, for example, to significantly increase the randomness by implementing a situation in which magnetic tunnel junction cells in which $m_i$=+1 and magnetic tunnel junction cells in which $m_i$=−1 are each close to 50%, a time-dependent variation of a magnetic field vector H(t) may be given as follows:

$$\vec{H}(t) = H_0 \exp\left(-\frac{t}{t_{decay}}\right)(\sin 2\pi ft, 0, \cos 2\pi ft) \quad \text{[Equation 5]}$$

In Equation 5, $t_{decay}$ represents a decay time at which strength of the external magnetic field is exponentially decreased with time.

Figure 8:
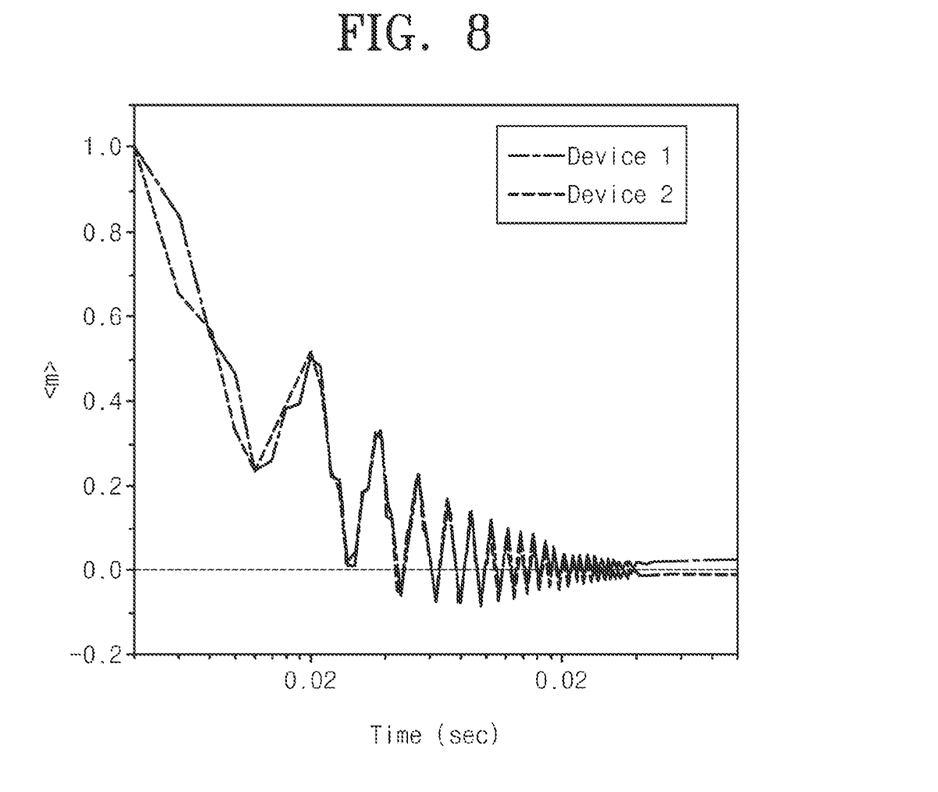
FIG. 8 is a graph illustrating a result obtained by calculating a time-dependent average magnetization direction based on a Monte-Carlo model when an external magnetic field H, having a strength decreased with time and rotating with time, is applied.

FIG. 8 is a graph illustrating a result obtained by calculating a time-dependent average magnetization direction based on a Monte-Carlo model when an external magnetic field H, having a strength decreased with time and rotating with time, is applied.

Referring to FIG. 8, <m> may be se to be 1 under the conditions that Δ=40, H0=586 Oe, f=120 Hz, $t_{decay}$=1 second, and t=0, as initial conditions immediately before an external magnetic field H is applied.

When the time-varying magnetic field of [Equation 5] is applied, a time-dependent variation of <m> may be displayed. In this case, <m> may be rapidly decreased in an initial period of time immediately after the external magnetic field is applied.

However, with the lapse of time, oscillation of <m> may disappear and <m> may have a value significantly close to zero. Accordingly, the strength of the external magnetic field may be reduced after a sufficient amount of time has elapsed, so that the external magnetic field may be prevented from preferring a specific direction. That is, the magnetic memory device may satisfy randomness.

Referring to FIG. 8, the PUF should satisfy (ii) irrelevancy. The term "irrelevancy" means that when random data patterns are written in different devices in the same manner, the data patterns of the respective devices are different from each other and are not related with each other. In this case, a time-dependent variation of <m> obtained by applying the same manner to two different devices (Device 1 and Device 2) was illustrated to check whether the irrelevancy is satisfied. Since the same time-varying magnetic field was applied to two different devices, time-dependent variations of <m> may be significantly similar to each other. However, a slight difference may arise in <m> due to an effect of thermal perturbation.

To check correlation of data written in the two devices, a correlation coefficient $c_{12}$ was defined at t=0.5 at which <m> of the two devices were close to zero, as follows:

$$c_{12} = \frac{1}{N}\sum_{i=1}^{N} m_{1,i}, m_{2,i}$$

where $m_{1,i}$ is data of an i-th cell of Device 1, and $m_{2,i}$ is data of an i-th cell of Device 2. When the data patterns of the two devices are completely related, $c_{12}$=1. When the data patterns of the two devices are completely unrelated, $c_{12}$=0.

Referring to FIG. 8, the calculated $c_{12}$=0.0184, which is significantly close to zero. This satisfies (ii) irrelevancy when applying the method described in the present embodiment. Accordingly, in the present embodiment, all of the three PUF conditions, (i) randomness, (ii) irrelevancy, and (iii) reliability, are satisfied.

A device, rotating an external magnetic field having a size of hundreds of Oe to thousands of Oe at high speed, is required to operate a PUF magnetic memory device according to the present disclosure.

Figure 9:
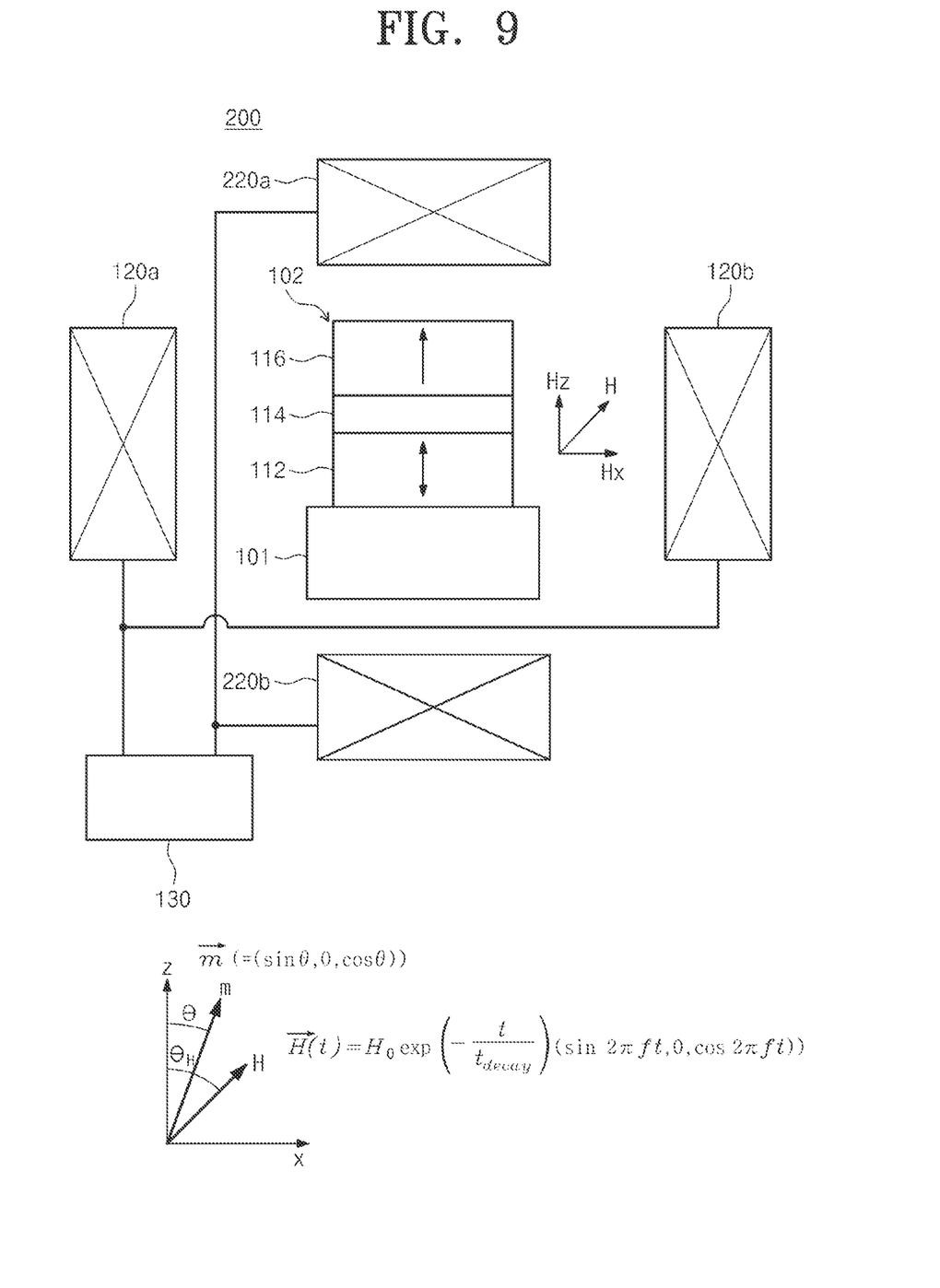
FIG. 9 is a conceptual diagram illustrating an apparatus for generating a time-varying external magnetic field according to another example embodiment of the present disclosure.

FIG. 9 is a conceptual diagram illustrating an apparatus for generating a time-varying external magnetic field according to another example embodiment.

Referring to FIG. 9, an apparatus 200 for writing data in an unclonable function magnetic memory device may includes first electromagnets 120a and 120b generating a first magnetic field $H_x$ in a first direction (an X-axis direction), second electromagnets 220a and 220b generating a second magnetic field $H_z$ in a second direction (a Z-axis direction) perpendicular to the first direction, and a controller 130 controlling currents flowing through the first electromagnet and the second electromagnet such that an external magnetic field H, which is a sum of the first magnetic field $H_x$ and the second magnetic field $H_z$, rotates while decreasing with time in a plane (an X-Y plane) defined by the first direction and the second direction. A physically unclonable function (PUF) magnetic memory device 100 may include a plurality of tunnel junction cells 102. The external magnetic field H may randomize a magnetization direction of a free magnetic layer 112 of the plurality of tunnel junction unit cells 102. The plane, defined by the first direction and the second direction, may be a plane including a magnetic easy axis (a Z-axis) of the free magnetic layer 112.

The first electromagnets 120a and 120b may include a pair of Helmholtz coils, and may be disposed to be spaced apart from each other in the X-axis direction. The second electromagnets 220a and 220b may include a pair of Helmholtz coils, and may be disposed to be spaced apart from each other in the Z-axis direction. The first electromagnets 120a and 120b may generate an $H_x$ component, and the second electromagnets 220a and 220b may generate an $H_z$ component. The external magnetic field H may rotate while decreasing with time. The $H_x$ component and the $H_z$ component may be given while decreasing with time t, as follows:

$$H_x = H_0 \exp\left(-\frac{t}{t_{decay}}\right)\sin 2\pi ft$$

$$H_z = H_0 \exp\left(-\frac{t}{t_{decay}}\right)\cos 2\pi ft$$

where $t_{decay}$ is a decay time at which strength of an external magnetic field is exponentially decreased with time, and f is a rotation frequency.

The PUF magnetic memory device 100 may include a plurality of tunnel junction cells 102 disposed on a substrate 101 and each including a pinned magnetic layer 116, a free magnetic layer 112, and a tunnel insulating layer interposed between the pinned magnetic layer 116 and the free magnetic layer 112. When an external magnetic field H, rotating while decaying with time, is applied to the plurality of magnetic tunnel junction cells 102, a magnetization direction of the free magnetic layer 112 of the plurality of magnetic tunnel junction cells 102 may be randomized and may have irrelevancy.

The pinned magnetic layer 116 and the free magnetic layer 112 may have perpendicular magnetic anisotropy, and a magnetic easy axis of the free magnetic layer 112 may be in a positive Z-axis direction.

Figure 10:
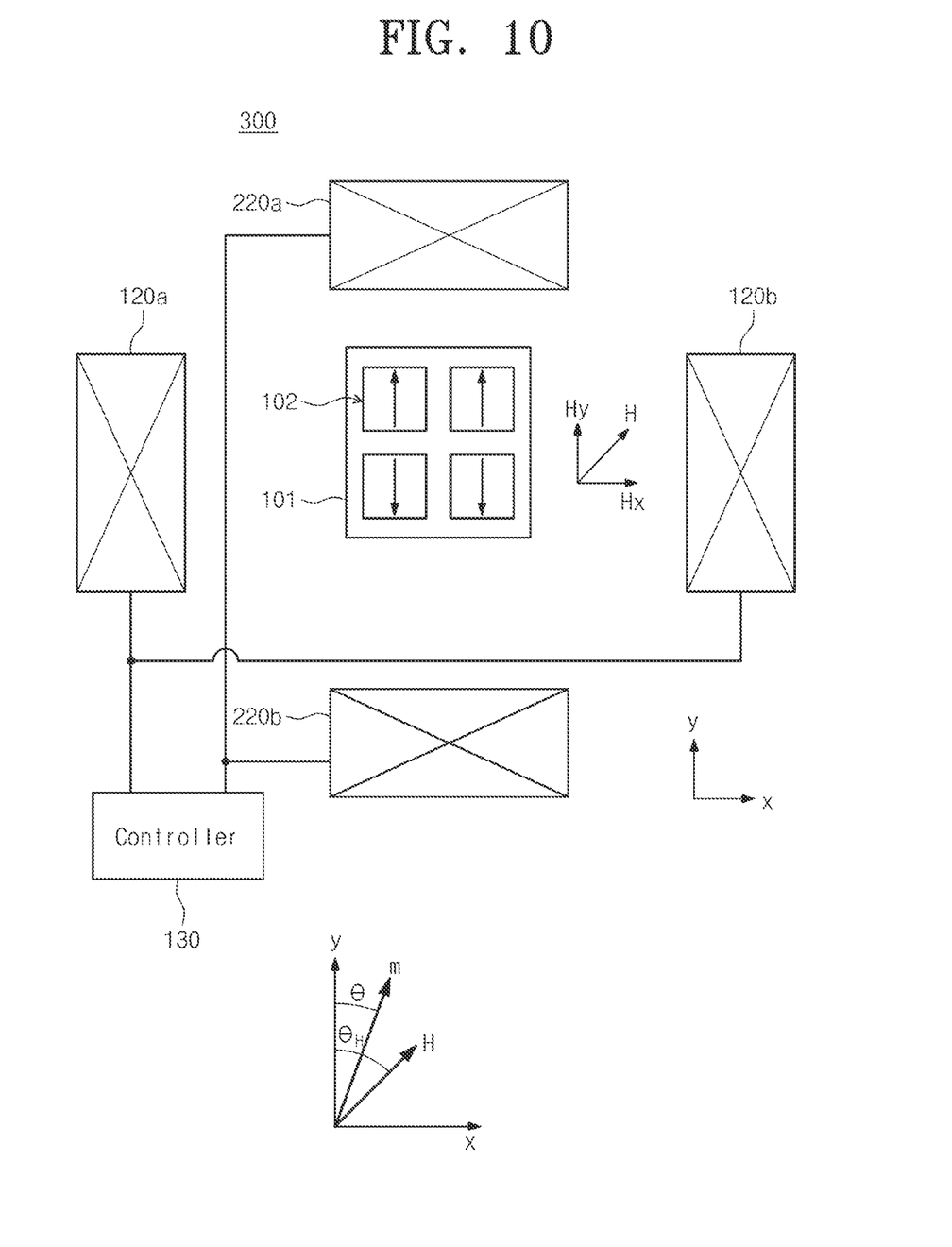
FIG. 10 is a conceptual diagram illustrating a method for generating a time-varying external magnetic field according to another example embodiment of the present disclosure.

FIG. 10 is a conceptual diagram illustrating a method for generating a time-varying external magnetic field according to another example embodiment.

Referring to FIG. 10, an apparatus 300 for writing data in an unclonable function magnetic memory device may include first electromagnets 120a and 120b generating a first magnetic field $H_x$ in a first direction (an X-axis direction), second electromagnets 220a and 220b generating a second magnetic field $H_y$ in a second direction (a Y-axis direction) perpendicular to the first direction; and a controller 130 controlling currents flowing through the first electromagnet and the second electromagnet such that an external magnetic field H, which is a sum of the first magnetic field $H_x$ and the second magnetic field $H_z$, rotates while decreasing with time in a plane (an X-Y plane) defined by the first direction and the second direction. A physically unclonable function (PUF) magnetic memory device 100 may include a plurality of tunnel junction cells 102. The external magnetic field H may randomize a magnetization direction of the free magnetic layer 112 of the plurality of tunnel junction unit cells 102. A plane (the X-Y plane) defined by the first direction and the second direction may be a plane including a magnetic easy axis (a Y-axis) of the free magnetic layer 112.

The first electromagnets 120a and 120b may include a pair of Helmholtz coils and may be disposed to be spaced apart from each other in the X-axis direction. The second electromagnets 220a and 220b may include a pair of Helmholtz coils, and may be disposed to be spaced apart from each other in the Y-axis direction. The first electromagnets 120a and 120b may generate an $H_x$ component, and the second electromagnets 220a and 220b may generate an $H_y$ component. The external magnetic field H may rotate while decreasing with time.

The PUF magnetic memory device 100 may include a plurality of magnetic tunnel junction cells 102 disposed on a substrate 101 and each including a pinned magnetic layer 116, a free magnetic layer 112, and a tunnel insulating layer 114 interposed between the pinned magnetic layer 116 and the free magnetic layer 112. When an external magnetic field H, which rotates while decaying with time, is applied to the plurality of magnetic tunnel junction cells 102, a magnetization direction of the free magnetic layer 112 of the plurality of magnetic tunnel junction cells 102 may be randomized and may have irrelevancy.

The pinned magnetic layer 116 and the free magnetic layer 112 may have in-plane magnetic anisotropy, and a magnetic easy axis of the free magnetic layer 112 may be in a Y-axis direction.

Figure 11:
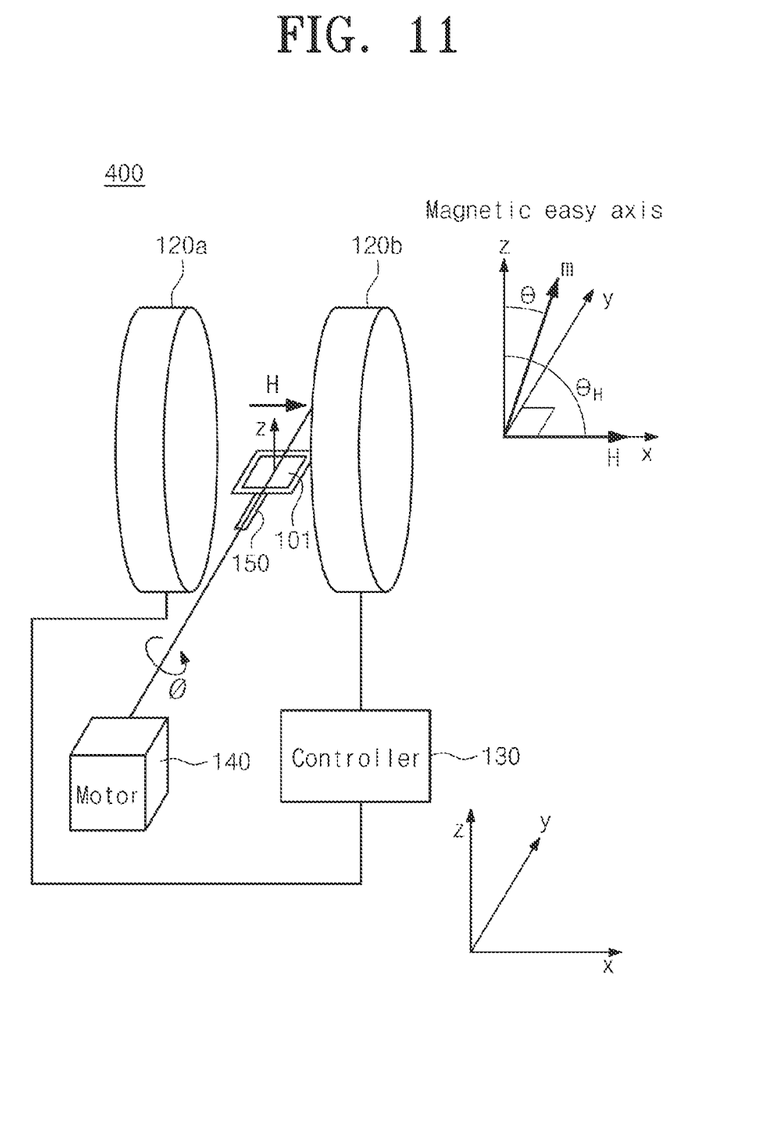
FIGS. 11 and 12 are conceptual diagrams illustrating a method for generating a time-varying external magnetic field according to another example embodiment of the present disclosure.
Figure 12:
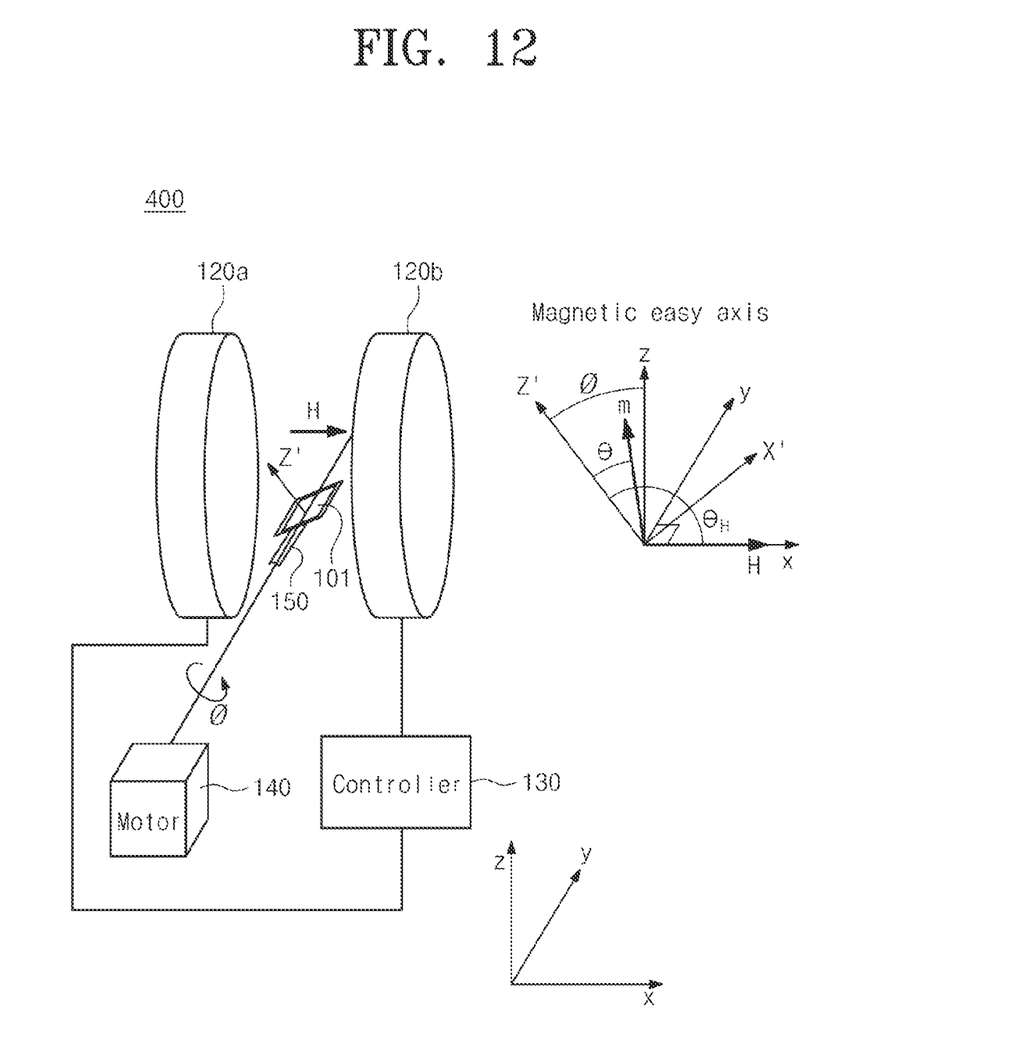

FIGS. 11 and 12 are conceptual diagrams illustrating a method for generating a time-varying external magnetic field according to another example embodiment.

Referring to FIGS. 11 and 12, an apparatus 400 for writing data in a physically unclonable function magnetic memory device may include electromagnet 120a and 120b reducing strength of an external magnetic field H in a predetermined direction (an X-axis direction) with time, a motor 140 supporting a substrate 101 and rotating the substrate 101, a controller 130 controlling current flowing through the electromagnet and controlling the motor 140, and a substrate rotation unit 150 mounting the substrate 101 thereon and connecting a rotation shaft of the motor 140. A physically unclonable function (PUF) magnetic memory device 100 may include a plurality of tunnel junction cells 102 disposed on the substrate 101. The external magnetic field H may randomize a magnetization direction of a free magnetic layer of the plurality of tunnel junction unit cells 102. The substrate 101 may rotate about a rotation axis (a Y-axis), perpendicular to a plane (a Y-Z plane) defined by a magnetic easy axis (a Z direction) of the free magnetic layer and the external magnetic field H, at a constant frequency f.

The substrate 101, on which magnetic tunnel junction cells are disposed, may rotate at high speed to rotate the external magnetic field H at high speed with time. For example, when observed in a rotation coordinates system (an X'Y'Z' coordinates system) rotating together with the substrate 101, the external magnetic field H may rotate with time.

When current is applied to the electromagnets 120a and 120b, an external magnetic field H in a positive X direction of a fixed coordinates system may be generated. When the magnetic memory device 100 or the substrate 101 rotates with the rotation of the motor 140, the magnetic memory device 100 may experience an external magnetic field rotating with time. The controller 130 may reduce current, flowing through the electromagnets 120a and 120b, with time. The electromagnets 120a and 120b may be a pair of Helmholtz coils. Accordingly, the magnetic memory device may experience the time-varying magnetic field described in Equation 5.

According to a modified embodiment, even in the case in which constant current is supplied to the electromagnet to generate an external magnetic field having predetermined strength, when the magnetic memory device rotates while falling out of a center of the electromagnet to the outside, the magnetic memory device may experience an effect of rotating the external magnetic field while reducing the strength of the external magnetic field with time.

As described above, in an operating method of a magnetic memory device according to example embodiments, a physically unclonable function (PUF) function may be performed using the magnetic memory device. For example, when a time-varying magnetic field is applied to a PUF magnetic memory device, three conditions of PUF, (i) randomness, (ii) irrelevancy, and (iii) reliability, may be simultaneously satisfied.

An unclonable function magnetic memory device may be integrated with a semiconductor device according to the related art. Thus, a physically unclonable function (PUF), difficult to be implemented in the semiconductor device according to the related art, or the like, may be implemented. In a situation in which the security of data transmission between devices and the security of the function of the device itself are becoming important, the present disclosure provides a magnetic memory device having PUF security which cannot be detected from an external entity. Accordingly, the present invention may be applied not only to existing computers and mobile phones, but also to IoT devices, electric vehicles, and the like, which require data transmission and storage, authentication of electronic products, and prevention of reproduction.

Although the present disclosure and its advantages have been described in detail, it should be understood that various changes, substitutions and alterations can be made herein without departing from the spirit and scope of the disclosure as defined by the following claims.

What is claimed is:

1. A method for operating a physically unclonable function magnetic memory device including a plurality of magnetic resistance cells disposed on a substrate and each including a pinned magnetic layer, a free magnetic layer, and a tunnel insulating layer or a non-magnetic conductive layer interposed between the pinned magnetic layer and the free magnetic layer, the method comprising:
applying an external magnetic field, which is decaying with time, to the plurality of magnetic resistance cells to randomize a magnetization direction of the free magnetic layer of each of the plurality of magnetic resistance cells.

2. The method of claim 1, wherein:
the external magnetic field rotates at a rotation frequency f with time in a plane including a magnetic easy axis of the free magnetic layer; and
strength of the external magnetic field has a decay constant and is exponentially decreased with time.

3. The method of claim 2, wherein:
the rotation frequency f is tens of hertz (Hz) to hundreds of Hz; and
the decay constant is greater than a reciprocal of the rotation frequency (1/f).

4. The method of claim 2, wherein:
the rotation frequency f is 120 Hz; and
the decay constant is 1 second (sec).

5. The method of claim 1, wherein:
strength of the external magnetic field has a decay constant and is exponentially decreased with time; and
the substrate rotates at a constant frequency with respect to a rotation axis, perpendicular to a plane defined by a magnetic easy axis direction of the free magnetic layer and the external magnetic field.

6. The method of claim 1, wherein:
the pinned magnetic layer and the free magnetic layer are magnetized in a direction, perpendicular to a film surface.

7. The method of claim 1, wherein:
the pinned magnetic layer and the free magnetic layer are magnetized in a direction, horizontal to a film surface.

8. The method of claim 1, wherein the external magnetic field is applied with a magnetic field application unit, the applying step comprises:
reducing strength of an external magnetic field in a predetermined direction with time with an electromagnet;
supporting and rotating the substrate with a motor;
controlling, by a controller, current flowing through the electromagnet and the motor; and
connecting and supporting, by a substrate rotating unit, the substrate and a rotational axis of the motor to each other.

9. The method of claim 1, wherein the external magnetic field is applied with a magnetic field application unit, the applying step comprises:
applying, by a first electromagnet, the external magnetic field to a first direction;
generating, by a second electromagnet, a second magnetic field in a second direction perpendicular to the first direction;
controlling, by a controller, currents flowing through the first electromagnet and the second electromagnet such that an external magnetic field, which is a vector sum of the first magnetic field and the second magnetic field, rotates while decreasing with time in a plane defined by the first direction and the second direction,
wherein the plane defined by the first direction and the second direction includes a magnetic easy axis of the free magnetic layer.

10. An apparatus for writing data in a physically unclonable magnetic memory device, the apparatus comprising:
a first electromagnet configured to apply the external magnetic field;
a second electromagnet configured to generate a second magnetic field in a second direction, perpendicular to the first direction; and
a controller configured to control currents flowing through the first electromagnet and the second electromagnet such that an external magnetic field, which is a sum of the first magnetic field and the second magnetic field, rotates while decreasing with time in a plane defined by the first direction and the second direction, wherein:
a physically unclonable magnetic device includes a plurality of tunnel junction cells;
the external magnetic field randomizes a magnetization direction of a free layer of each of a plurality of tunnel junction unit cells; and
the plane, defined by the first direction and the second direction, includes a magnetic easy axis of the free magnetic layer.

11. An apparatus for writing data in a physically unclonable magnetic memory device, the apparatus comprising:
an electromagnet configured to reduce strength of an external magnetic field in a predetermined direction with time;
a motor configured to support a substrate and to rotate the substrate;
a controller configured to control current flowing through the electromagnet and to control the motor; and
a substrate rotation unit configured to mount the substrate thereon and to connect a rotation axis of the motor, wherein:
a physically unclonable magnetic memory device includes a plurality of tunnel junction cells disposed on the substrate;
the external magnetic field randomizes a magnetization direction of a free magnetic layer of each of a plurality of tunnel junction unit cells; and
the substrate rotates at a constant frequency f with respect to a rotation axis, perpendicular to a plane defined by a magnetic easy axis of the free magnetic layer and the external magnetic field.

* * * * *